United States Patent
Becker et al.

(10) Patent No.: US 6,647,691 B2
(45) Date of Patent: Nov. 18, 2003

(54) TRACK ARRANGEMENT FOR SUPPORTING WALL STUDS; METHOD; AND, WALL FRAMEWORK ASSEMBLY

(76) Inventors: Duane William Becker, 34747 Csah 17, Watkins, MN (US) 55389; Brian Duane Becker, 9 Cherry Cir., St. Cloud, MN (US) 56304

(*) Notice: Subject to any disclaimer, the term of this patent is extended or adjusted under 35 U.S.C. 154(b) by 0 days.

(21) Appl. No.: 09/883,006

(22) Filed: Jun. 15, 2001

(65) Prior Publication Data

US 2002/0189192 A1 Dec. 19, 2002

(51) Int. Cl.⁷ .............................................. E04C 02/38
(52) U.S. Cl. .................... 52/656.1; 52/690; 52/481.1; 52/731.9; 52/733.2; 52/733.3; 52/482; 52/289; 403/388; 403/326; 403/329; 403/242; 403/403
(58) Field of Search ................................ 52/690, 481.1, 52/731.9, 733.2, 733.3, 482, 289; 403/388, 326, 329, 242, 403

(56) References Cited

U.S. PATENT DOCUMENTS

| | | |
|---|---|---|
| 1,867,329 A | 7/1932 | Ryan |
| 2,275,109 A | 3/1942 | McGee |
| 3,001,615 A | 9/1961 | Ries |
| 3,101,817 A | 8/1963 | Radek |
| 3,536,345 A | 10/1970 | Leifer |
| 3,604,176 A * | 9/1971 | Campbell .................... 403/255 |
| 3,680,271 A | 8/1972 | Satchell |
| 3,845,601 A | 11/1974 | Kostecky |
| 3,852,927 A | 12/1974 | Birum, Jr. |
| 4,492,066 A | 1/1985 | LaLonde |
| 4,805,364 A | 2/1989 | Smolik |
| 4,809,476 A | 3/1989 | Satchell |
| 4,854,096 A | 8/1989 | Smolik |
| 4,918,899 A | 4/1990 | Karytinos |
| 5,081,813 A | 1/1992 | White |
| 5,146,723 A | 9/1992 | Greenwood et al. |
| 5,203,132 A | 4/1993 | Smolik |
| 5,222,335 A | 6/1993 | Petrecca |
| 5,313,752 A * | 5/1994 | Hatzinikolas ................. 52/243 |
| 5,321,924 A | 6/1994 | Smolik |
| 5,394,665 A | 3/1995 | Johnson |
| 5,471,805 A | 12/1995 | Becker |
| 5,660,012 A | 8/1997 | Knudson |
| 5,755,066 A | 5/1998 | Becker |
| 5,797,233 A * | 8/1998 | Hascall ....................... 52/481.1 |
| 5,813,177 A | 9/1998 | Wu |
| 5,930,968 A | 8/1999 | Pullam |
| 6,094,872 A | 8/2000 | Ward et al. |
| 6,151,858 A | 11/2000 | Ruiz et al. |
| 6,176,053 B1 | 1/2001 | St. Germain |

* cited by examiner

Primary Examiner—Carl D. Friedman
Assistant Examiner—Steve Varner
(74) Attorney, Agent, or Firm—Merchant & Gould P.C.

(57) ABSTRACT

A track arrangement for supporting wall studs is provided. The track arrangement includes a central longitudinal extension, first and second sidewalls and a first stud clip arrangement comprising a pair of stud clips. In a preferred embodiment, each clip comprises a portion of the sidewall bent inwardly, to form a cam surface and a stud ridge receiver. During use, the stud is forced toward the cam surface, bending the clip until a portion of the stud, specifically a stud ridge, is received in the stud ridge receiver. This will secure the stud in place, against undesired movement relative to the track. Wall assemblies are provided which preferably involve one such track arrangement positioned on the floor as a floor track, and one on the ceiling, as a ceiling track, with a stud extending therebetween. The wall framework assembly can be assembled as a slip track, or as a non-slip track.

24 Claims, 11 Drawing Sheets

TRACK ARRANGEMENT FOR SUPPORTING WALL STUDS; METHOD; AND, WALL FRAMEWORK ASSEMBLY

FIELD OF THE INVENTION

The present invention is directed to the field of building construction and more particularly to arrangements for assembling framework of buildings. In a preferred application, the invention particularly concerns a track system for supporting wall studs, in a snap-fit manner.

BACKGROUND OF THE INVENTION

A wide variety of arrangements have been utilized for the assembly of walls. Many concern tracks positioned along the floor and ceiling, between which are extended vertical studs. A variety of methods for providing interaction between the studs and the tracks, are known. Examples are provided in U.S. Pat. Nos. 5,797,233; 5,660,012; 5,394,665; 5,222,335; 4,854,096; 4,805,364; 3,536,345; and, 3,852,927.

In general, improvement has been sought with respect to such systems, generally to better accommodate: manufacture of parts; ease of installation; structural integrity of the resulting wall frame; and, adaptability for use under a variety of circumstances.

SUMMARY OF THE INVENTION

A track arrangement for supporting frame members such as wall studs is provided. The track arrangement can be utilized to provide framework assemblies. A typical wall framework assembly utilizing principles according to the present invention includes: a floor track as characterized; a ceiling track as characterized; and, at least one and typically a plurality of wall studs extending between the floor track and the ceiling track. The principles described can be utilized in association with both load bearing walls and non-load bearing walls. Further the principles described can be applied in the context of a wall having a slip track, for vertical movement, between the ceiling track and the vertical wall studs.

The principles described herein can be provided in a variety of forms. In some, each track arrangement comprises more than one piece. In others, each track arrangement comprises a single unitary integral piece.

A preferred track arrangement, for example, utilizable as either the floor track or the ceiling track includes: a central extension; and, a pair of sidewalls. According to the present disclosure, a preferred stud clip assembly is provided in the track. The preferred stud clip assembly generally comprises a clip in each sidewall, formed integrally with the associated sidewall, typically through a die cutting operation. The preferred stud clip is centrally disposed in a sidewall, and comprises an extension bent inwardly and into a preferred configuration for engagement with a portion of a stud. In general, the preferred configuration is formed to include: a front cam surface which is engaged by a portion of the stud, during wall assembly; and, a central stud ridge receiver, which snaps over a portion of the stud during wall assembly.

The principles of the present invention include track arrangements as characterized, wall assemblies utilizing such track arrangements, and methods of assembling walls utilizing such components.

The principles of the present disclosure can also be applied to framework besides wall framework. The structural features would be the same or analogous.

DETAILED DESCRIPTION

The Structural Components, Generally

Figure 1:
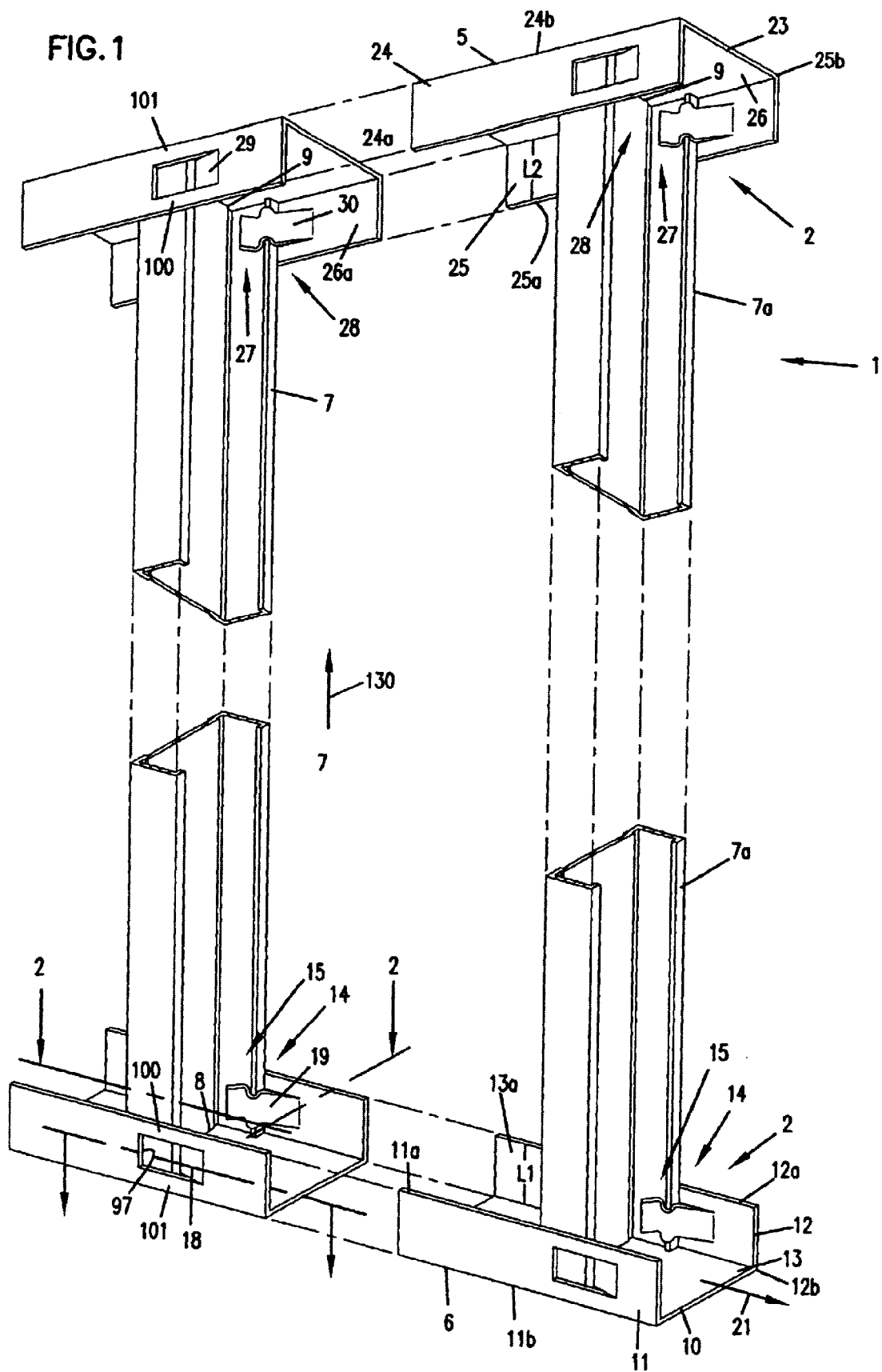
FIG. 1 is a fragmentary schematic perspective view depicting a wall framework assembly comprising a ceiling track, a floor track and vertical studs extending therebetween, in accord with the present invention.

Reference No. 1, FIG. 1, depicts a framework assembly, specifically a wall framework assembly in accord with the present invention.

In general, the wall assembly 1 according to the present invention utilizes a unique track arrangement. In typical wall framework assemblies, two track arrangements will be used: a first track assembly as a floor track; and, a second track assembly, as a ceiling track. In general, the preferred wall framework assembly concerns engagement between one or more wall studs, or other frame members, and the preferred track arrangements.

Referring now to FIG. 1, the preferred wall framework assembly 1 depicted includes a track arrangement 2 comprising: a ceiling runner or ceiling track 5 and a floor runner or floor track 6; and, at least one frame member, in this instance stud 7, extending between the ceiling track 5 and the floor track 6. (Actually, two identical studs 7 and 7a are depicted.) For a typical wall framework 1, ceiling track 5 and floor track 6 will be positioned in a building, to extend with the ceiling track 5 positioned over the floor track 6. A variety of spacings for studs 7, 7a could be utilized, for example typically about 8 inches to 24 inches, inclusive, on center, depending on the wall.

The principles described herein for the wall framework 1 can be used for load bearing walls and also for non-load bearing walls. For typical load bearing walls, one end 8 of each stud 7, 7a is bottomed out in the floor track 6, and the other end 9 of each stud 7, 7a is bottomed out in the ceiling track 5, so that the studs 7, 7a bear a vertical load force of the wall framework 1, i.e., the studs 7, 7a bear vertical load of the building. By the term "bottomed out" in this context, it is meant that the ends 8, 9 of the studs 7, 7a are pressed into and against the tracks 5, 6, with no vertical space or gap therebetween.

For non-load bearing walls, it is not necessarily required that the studs 7, 7a be bottomed out in the ceiling track 5. Reasons why it may be desirable not to bottom out studs 7, 7a in ceiling track 5 will be apparent from further descriptions herein, relating to FIGS. 7 and 9, and to application of the principles described herein with respect to wall frameworks in the context of a slip track wall.

Still referring to FIG. 1, the preferred floor track 6 depicted comprises base or center extension 10, and first and second opposite sidewalls 11 and 12. In general, the sidewalls 11 and 12 extend parallel to one another, with the base or center extension 10 therebetween. In general, a trough 13 defined by inside surfaces of the sidewalls 11 and 12, and an inside surface of the center extension 10, will sometimes be referred to as the "inside" of the floor track 6; thus trough 13 comprises the inside 13a of the associated track 6. In a typical small framework assembly, in which the stud 7 is bottomed out in the floor track 6 as characterized above, the end 8 of the stud 7 is inserted into trough 13 until that end 8 abuts center extension 10.

In the previous paragraph, the trough 13 and inside 13a were characterized as portions of "the associated" track 6. In this context, the term "associated" is meant to provide a shorthand way of identifying which of the two tracks, 5, 6, is being referenced; in particular the term "associated" means the portion on which the previously identified features (trough 13 and inside 13a) are found. This abbreviated reference will be used in this disclosure, in an analogous manner, in other contexts.

Still referring to FIG. 1, sidewalls 11 and 12 respectively include outer edges 11a and 12a. Herein the outer edges of 11a and 12a of the associated ones of walls 11 and 12 are the edges remote from the associated extension 10. The sidewall edges 11b, 12b adjacent center extension 10 will be referred to as inner edges.

The floor track 6 includes, positioned on sidewalls 11, 12, stud clip arrangements 14. In general, a typical floor track 6 will include a series of stud clip arrangements 14, spaced along the longitudinal extension of the floor track 6. Each stud clip arrangement 14 preferably comprises a pair of clips 15, each pair 15 comprising first and second clips, 18, 19 preferably positioned opposite to one another, on associated ones of sidewalls 11 and 12 respectively. By "opposite" in this context, it is meant that the clips 18 and 19 are preferably positioned along the longitudinal extension indicated by arrow 21, directly opposite from one another across center extension 10, generally as mirror images of one another.

In general, the preferred ceiling track 5 comprises analogous components, i.e., base or center extension 23; associated first and second opposite sidewalls 24 and 25 having outer edges 24a, 25a and inner edges 24b, 25b and forming, together with center extension 23, trough 26 defining inside 26a; and, stud clip arrangements 27 comprising pairs 28 of individual clips 29, 30. Indeed, in some preferred wall frameworks made according to the present invention, the ceiling track 5 and the floor track 6 are generally identical, with respect to these features, and are simply mounted as mirror images, i.e., oriented in opposition. It is noted that for the particular wall framework 1 depicted, the ceiling track 5 and floor track 6 are identical. With respect to this, and still referring to FIG. 1, attention is directed to dimension L1 on floor track 6, and dimension L2 on ceiling track 5. Dimension L1 indicates the depth of trough 13, i.e., the depth dimension of associated sidewalls 11, 12; and, dimension L2 reflects the depth of trough 26, i.e., the depth dimension of associated sidewalls 24, 25. For the particular wall assembly 1 depicted in FIG. 1, L1=L2.

Figure 7:
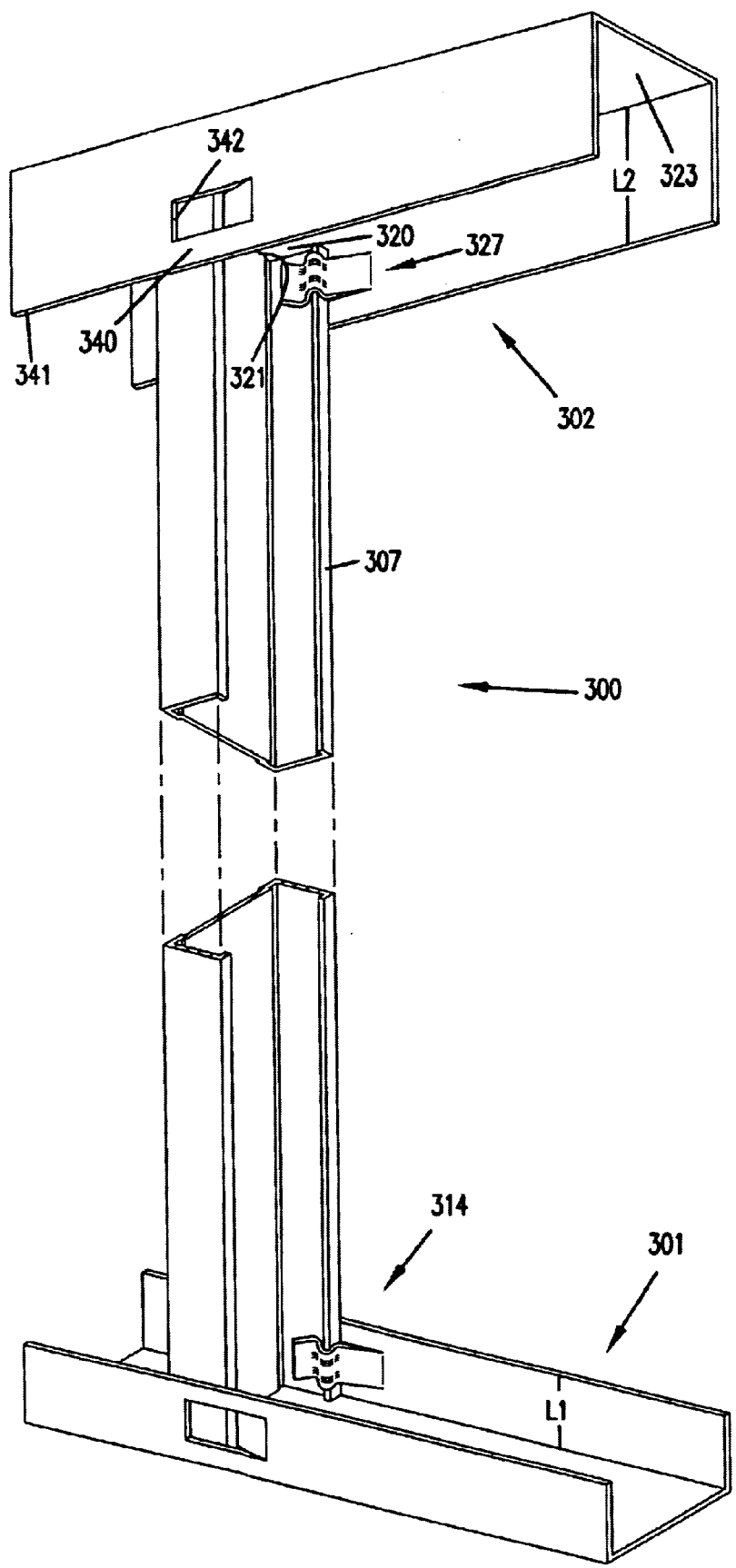
FIG. 7 is a fragmentary schematic perspective view of an alternate embodiment to the arrangement depicted in FIG. 1; the arrangement of FIG. 7 depicting a slip track variation.

As will be described below in greater detail, in some instances it will be preferred to form a sidewall assembly in which L1<L2. Such an assembly is depicted in FIG. 7, described in detail below. This type of arrangement is particularly useful for a wall having a slip track in a ceiling portion thereof.

Referring again to wall framework 1, FIG. 1, there is no specific requirement that sidewalls 11 and 12 be identical (but oriented as mirror images of one another) nor is there such a requirement for sidewalls 24, 25. However, in general, typical preferred constructions will be arranged in this manner. This facilitates construction and use, as will be apparent from further descriptions.

Figure 2:
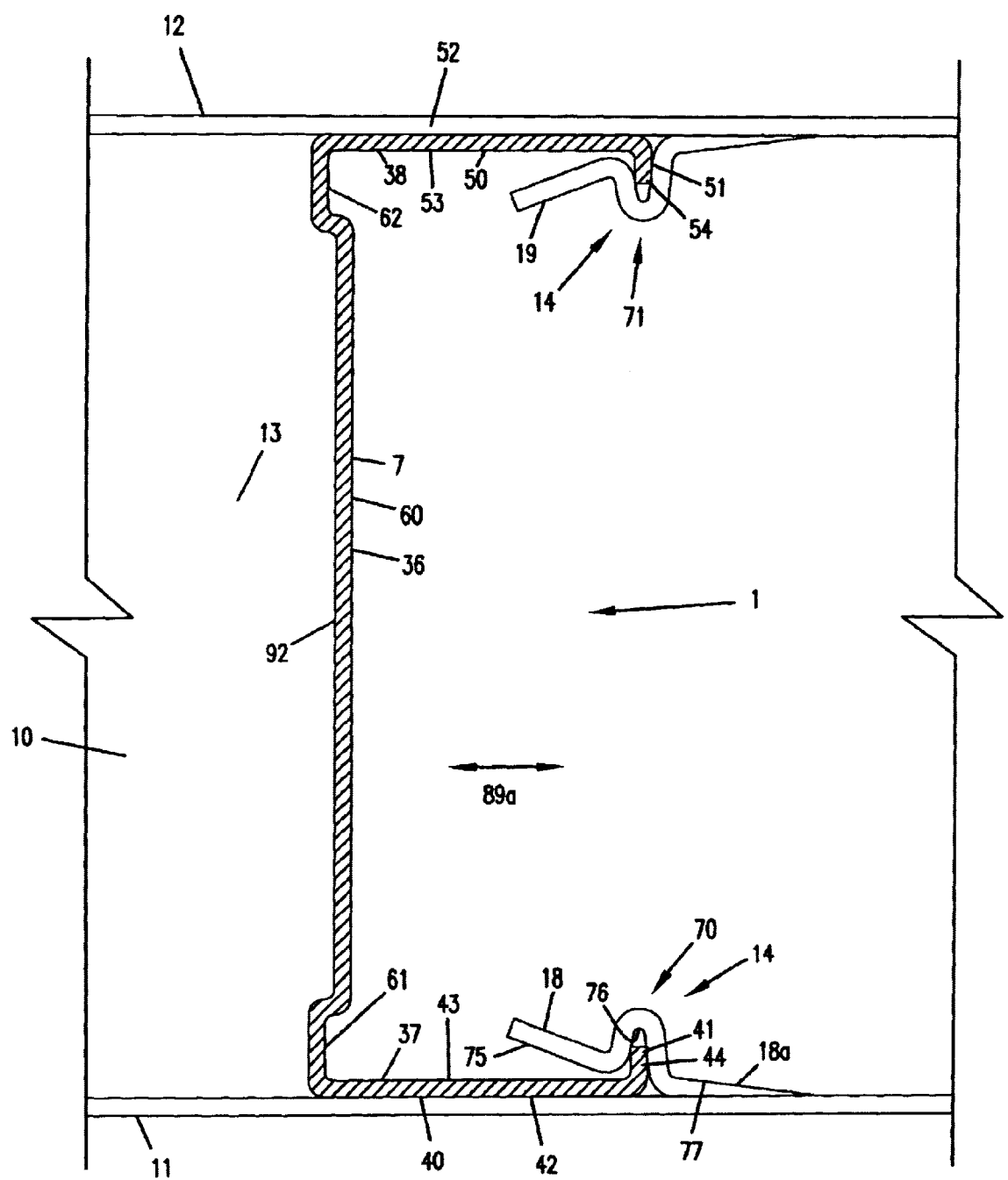
FIG. 2 is an enlarged fragmentary schematic cross-sectional view taken along line 2—2, FIG. 1.

Attention is now directed to stud 7. A cross-sectional view of arrangement 1 is depicted in FIG. 2, providing, among other things, a cross-sectional view of stud 7. Referring to FIG. 2, the stud 7 comprises a base wall or back wall 36, positioned between first and second, associated, longitudinal sidewalls 37 and 38. In the preferred arrangement 1 depicted, the sidewalls 37, 38 are identical and are positioned as mirror images of one another.

In general, sidewall 37 includes an outer hanger wall 40 and an inner projection ridge or stud ridge 41. The portion of sidewall 38 comprising hanger wall 40 generally provides, among other things, a function of a structure or surface on which a wall covering can be secured. The preferred hanger wall 40 depicted has associated outer and inner surfaces 42, 43 that are both flat and extend parallel to one another.

Figure 3:
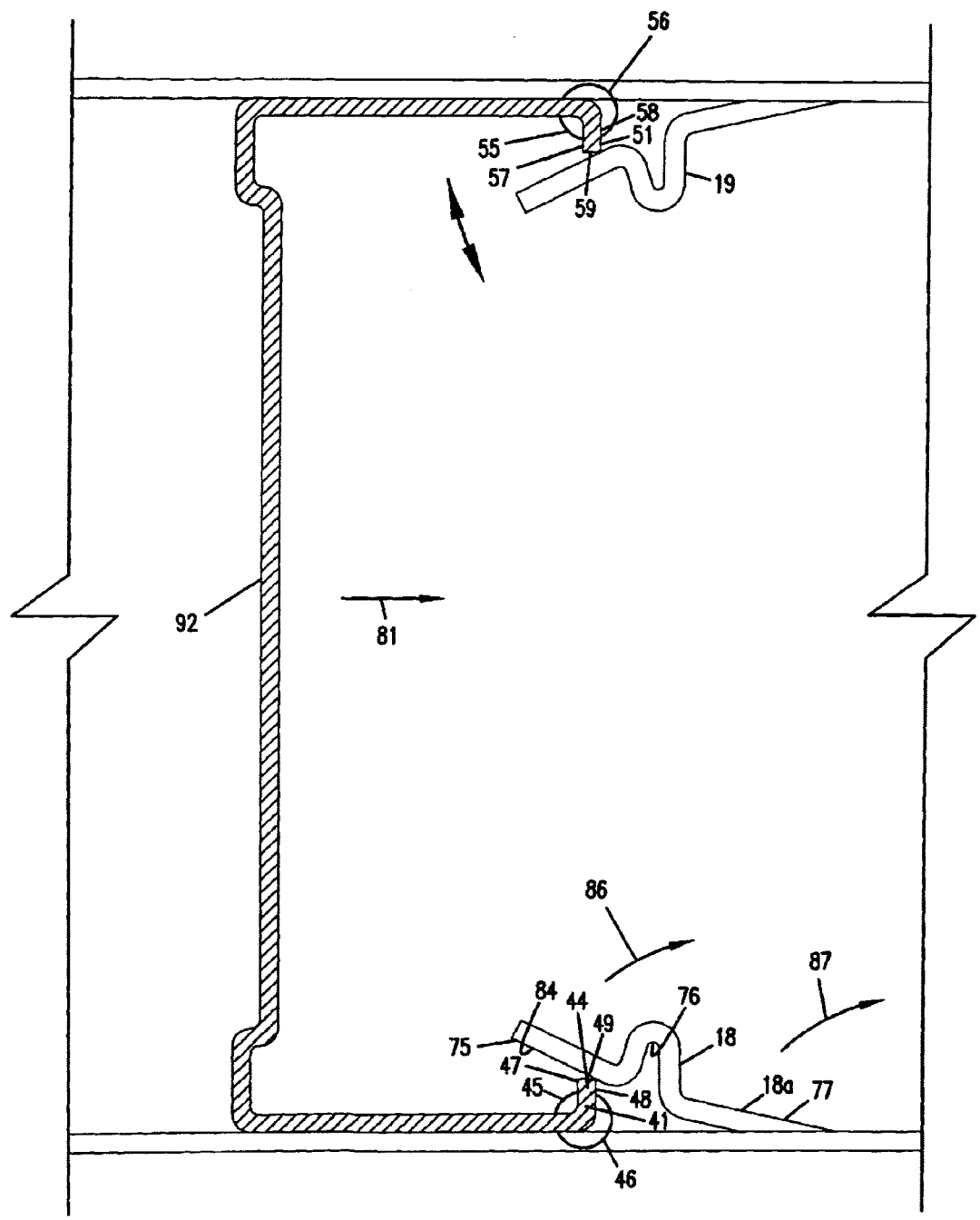
FIG. 3 is a view analogous to FIG. 2, depicting a step of assembly.

Ridge 41 is positioned on, and directed away from, hanger wall 40 and allows for mechanical interaction with the stud clip arrangements 14, 27 to help secure the stud 7 in vertical extension between tracks 5, 6, as described below. A preferred configuration for ridge 41 is as an extension or wall 44 projecting from, and typically orthogonal to, hanger wall 40, i.e., with angle 45 (FIG. 3) being 90° and angle 46 (FIG. 3) being 270°. Preferably, then, wall 44 (FIG. 3) has: first and second opposite surfaces 47 and 48 which are flat and extend parallel to one another; and, end edge 49, which is perpendicular to surfaces 47, 48 and generally parallel to hanger wall 40. Example dimensions for ridge 41 are provided below.

Referring again to FIG. 2, preferably sidewall 38 is a mirror image of sidewall 37, having outer hanger wall 50 and ridge 51. Thus, preferably wall 50 is parallel to wall 40, with outer and inner surfaces 52, 53 preferably flat and parallel to one another. Also, preferably ridge 51 comprises wall 54 projecting from, and typically orthogonal to, hanger wall 50, with angle 55 (FIG. 3) being 90°, with angle 56 (FIG. 3) being 270°, with first and second opposite surfaces 57 and 58 extending generally parallel to one another, and with end edge 59.

Referring again to FIG. 2, the particular stud 7 depicted has a base 36 that includes a recessed strip or center 60 and side trough sections 61 and 62. It is noted that a variety of configurations for base 36 can be used in assemblies according to the present invention, the particular configuration, comprising recessed center 60 and side sections 61, 62 merely being an example.

In preferred arrangements, the distance between outside surface 42 and outside surface 52, of stud 7, will be selected to provide a snug fit when the stud 7 is positioned between sidewalls 11, 12 and sidewalls 24, 25, of the floor track 6 and ceiling track 5, respectively. A preferred fit will be one which provides for surface engagement, or a very slight gap, and no significant bow or bend stress to the various components 5, 6, and 7.

It is noted that the tracks 5, 6 and the studs 7, 7a may have various apertures therein.

Components Providing for Preferred Interlock Fit Between the Wall Stud 7 and the Ceiling and Floor Tracks 5, 6

In general, the present disclosure provides for a preferred interlock (connective) fit between the stud 7 and the ceiling and floor tracks 5, 6. When employed in the form of the preferred embodiments depicted, the disclosed principles provide for the following:

1. Standard frame members (studs) of the type depicted in FIGS. 1 and 2 can be used, without modification, as the vertical wall supports.
2. The frame members (studs) 7, 7a can be relatively easily and safely locked in place at a construction site.
3. The tracks 5 and 6 are of the type which can be readily and inexpensively manufactured and installed.
4. The wall framework is of a type that can be applied as framework for either a load bearing wall or a non-load bearing wall.
5. The principles can be applied as a slip track wall.
6. The interlock mechanism is such that although the frame members (studs) 7, 7a can easily be locked in place, there is significant resistance to removal of them once locked in place.

Attention is again directed to FIG. 2. In FIG. 2, at 70, interaction between ridge 41 of stud 7 and an associated stud clip arrangement 14 is depicted. Analogously, at 71 interaction between ridge 51 of stud 7 and an associated stud clip arrangement 14 is depicted. As a result of the two interactions at 70, 71, the stud 7 is secured to floor track 6, between sidewalls 11 and 12.

Referring to FIG. 1, interaction between the stud 7 and the ceiling track 5 would be analogous. That is, the cross-section shown in FIG. 2 would have an identical appearance, for the preferred embodiment depicted, if taken directed toward the ceiling track 5, as opposed to the floor track 6.

Referring to FIG. 2, the interaction between the stud 7 and the floor track 6 depicted at 70, involves receipt of a portion of ridge 41 into associated clip 18; and, the interaction at 71 concerns securing a portion of ridge 51 in associated clip 19. The interactions 70, 71, as shown in FIG. 2, for the preferred embodiment are generally identical and oppositely positioned.

Referring more specifically to interaction 70, the preferred clip 18 is a bent extension 18a that includes the following features: front cam extension 75; stud ridge receiver trough 76; and, rear spring extension 77. Operation of these components of clip 18, during assembly of wall framework 1, will be apparent by reference to FIGS. 2 and 3. Specifically, during assembly, an end portion of stud 7 is positioned between sidewalls 11, 12 as shown FIG. 3. To provide locking engagement, stud 7 is moved forward in the direction of arrow 81, toward the associated pair of stud clips, causing ridge 41 to engage surface 84 of front cam extension 75, as shown. Continued movement in the direction of arrow 81, will cause cam extension 75 to bow in the direction of arrow 86, and will also cause spring extension 77 to bow in the direction of arrow 87, i.e., away from sidewall 11 and toward sidewall 12. As movement continues in the direction of arrow 81, FIG. 3, eventually ridge 41 will encounter the stud ridge receiver trough 76, and clip 18 will snap back toward sidewall 11 to the configuration depicted in FIG. 2. This will trap or lock a portion of ridge 41 in central receiver trough 76, securing (locking) this portion of stud 7 in place against unintended movement in the direction of double-headed arrow 89a, FIG. 2. An analogous, mirror image, engagement will occur between ridge 51 and associated clip 19.

Since, for the preferred embodiment depicted, clip 19 and clip 18 are oriented as mirror images of one another, and since stud 7 has symmetry (in mirror image) along its center, engagement between clip 18 and ridge 41 will typically occur simultaneously with engagement between clip 19 and ridge 51, as the stud 7 is pushed in the direction of arrow 81. It is anticipated that at work sites, a worker will typically cause the motion of the stud 7 in the direction of arrow 81 to occur by kicking a lower portion of the stud 7 on rear surface 92.

Figure 4:
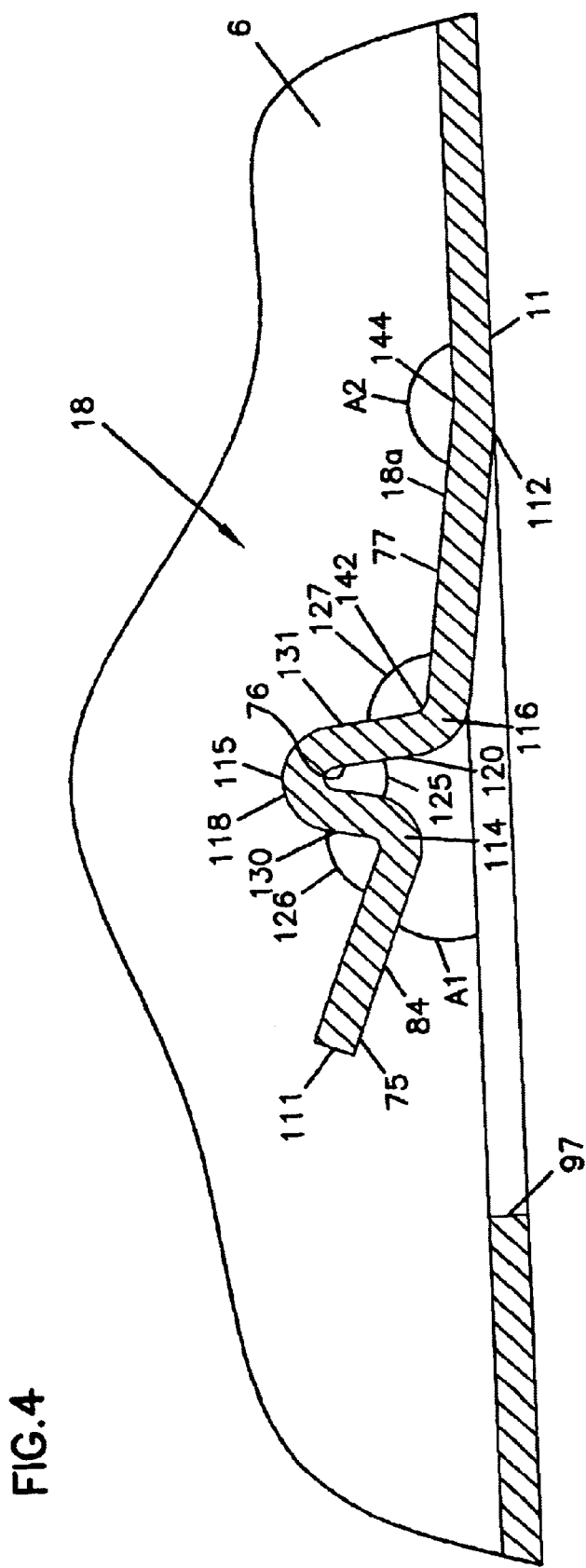
FIG. 4 is an enlarged, fragmentary side cross-sectional view of a clip member in one of the ceiling and floor tracks, of the arrangement of FIG. 1; the view of FIG. 4 being from line 4—4, FIG. 1.

From review of FIGS. 1 and 4, preferred configurations of the clips or clip members 18, 19 will be apparent. Referring first to FIG. 1, for the preferred embodiment 1 depicted, each of clips 18 and 19 is integral with the associated floor track 6. By "integral" in this context, it is meant that the clips 18 and 19 are not separate members attached to floor track 6, but rather are formed from portions of the associated sidewalls 11 and 12 respectively, cut and bent in a preferred configuration. Forming the clips 18 and 19 integrally with the track 6 in this manner, facilitates manufacture and handling, as well as assembly and structural integrity.

Still referring to FIG. 1, in addition to being integral with the sidewall in which it is formed, each of the clips 18, 19, is preferably centrally disposed in the sidewall with which it is integral. The meaning of the term "centrally disposed" in this context, can be understood by reference to clip 18, and sidewall 11, FIG. 1. Specifically, referring to FIG. 1, clip 18 is positioned spaced from both outer edge 11a and inner edge 11b of associated sidewall 11. Indeed, clip 18 is a portion bent inwardly of track 6 leaving open cut or four-sided frame 97. Thus, the term "centrally disposed" is meant to indicate that the corresponding or associated clip 18 defined, is not adjacent to an outer edge or inner edge of the sidewall with which it is associated, but rather, when integral, it is a portion of the sidewall (is integral) bent inwardly from a corresponding three-sided cut, leaving a four-sided frame. Preferably, the clip 18 is spaced, from a corresponding (associated) outer edge 11 a of the sidewall 11, by a distance of at least 0.25 inch, preferably a distance within the range of 0.25 inch to 0.75 inch, inclusive. Also preferably the clip 18 is spaced, from a corresponding inner edge 11b of sidewall 11, by a distance of at least 0.25 inch, preferably a distance of 0.25 inch to 8 inches, inclusive.

A benefit to providing the clip 18 "centrally disposed", is that in the corresponding sidewall 11, there is left a lateral support extension 100, positioned to extend adjacent in associated stud 7, above (in the case of the floor track 6) or below (in the case of the ceiling track 5), the corresponding portion of the clip arrangement 14. The lateral support extension 100 helps ensure a strong secure support for the stud 7, and thus structural integrity to the wall framework 1. Also a result of being "centrally disposed" is that there is left an associated lateral support extension 101 positioned to extend adjacent and associated stud 7 below (in the case of the floor track 6) or above (in the case of ceiling track 5), the corresponding portion of the clip arrangement 14. The lateral support extension 101 also helps insure a strong, secure support for the stud 7 and thus structural integrity to the wall frame.

Herein, extension 100 will sometimes be characterized as extending between associated or adjacent outer edge of the sidewall in which it is positioned, and the clip in (or on) that associated sidewall; and, lateral support 101 will be characterized as positioned between the base or inner edge of the sidewall in which it is positioned, and an associated clip.

A particular preferred configuration for the clips 18, 19, is depicted in schematic cross-sectional view in FIG. 4. Referring to FIG. 4, clip 18, in associated sidewall 11 is depicted. It will be understood however that the depiction of FIG. 4 could be of any one of the clips in its associated sidewall. In FIG. 4, clip 18 is depicted as it would appear in sidewall 11 prior to being engaged by a stud 7. The orientation and position depicted in FIG. 4 will be referred to herein as the "memory" or "rest" position of the clip 18. By the terms "memory position" and "rest position" in this context, reference is meant to a position the characterized clip 18 takes after it has been formed to the sidewall 11 and prior to any engagement with a stud 7; and, as a result, it is the position to which the clip 18 attempts to return, if it has not been bent or sprung beyond a spring limit or elastic limit of the material from which the track 6 is formed.

Referring to FIG. 4, the clip 18, again, comprises a bent extension 18a and includes front cam extension 75, central receiver trough 76 and rear spring extension 77. The front cam extension 75 includes a front surface 84 oriented to engage or contact stud 7, during assembly of wall framework 1. There is no requirement that front surface 84 be planer; however for the particular clip 18 depicted, it is. In general, front surface 84 extends at an acute (<90°) angle A1, relative to wall 11.

Still referring to FIG. 4, in general, the clip 18 comprises a bent extension 18a, having a free end 111. Herein the term "free end" when used in reference to a bent extension 18a or a clip 18, is meant to refer to an end remote from a point of attachment 112 with an associated sidewall. Besides the free end, in general, the bent extension 18a includes a portion defining front cam surface 84 and three bends 114,115,116 defining the central or stud receiver trough 76. The stud receiver trough 76 has a receiver opening 120, and the three bends 114,115 and 116 are oriented to direct the receiver opening 120 away from opposite sidewall 12 (FIG. 1) and toward an associated sidewall 11, specifically toward frame 97 in associated sidewall 11.

Herein, the front cam surface 84 will sometimes be referred to as extending between free end 111 and stud ridge receiver trough 76.

In general, the three bends 114,115,116 comprise front bend 114, center bend 115 and a rear bend 116; with the front bend 114 being the bend at a corner of the receiver trough 76 closest to free end 111; with the rear bend 116 being at a corner of the receiver trough 76 furthest from the free end 111; and, with the center bend 115 being between the front and rear bends 114,116 and generally forming an apex 118 of the receiver trough 76.

Herein, in some instances, each of bends 114,115,116 will be defined with respect to its internal angle. The term "internal angle" when used in association with a bend, is meant to refer to the <180° angle (or side) of the bend. Thus, for center bend 115, the internal angle is the angle indicated at 125; for front bend 114, the internal angle is the angle indicated at 126; and for rear bend 116, the internal angle is the angle indicated at 127. Referring to FIG. 4, it is apparent the bends 114,115,116 are not formed on a sharp crease, but rather are defined by bending to desired radii. When a dimension is provided for the angle, it is meant between associated sidewalls, once a straight portion is reached, as indicated by the locations of the identifying lines for the angles, 125,126,127.

In typical preferred embodiments, center bend 125 will have an inside angle within the range of 15° to 25°, inclusive, typically about 20°; the front bend 126 will have an inside angle within the range of about 75° to 85°, inclusive, typically about 80°; and the rear bend 127 will have an inside angle within the range of about 95° to 105°, inclusive, typically about 100°. This configuration can be readily obtained out of structural material from which tracks 5,6 are typically formed, i.e., 12–25 gauge, inclusive, (0.0247–0.1084 inch thick) galvanized steel. The term "inclusive" in this context is used to indicate that the end figures are included in the stated range.

In order to operate desirably as a cam extension 75, when a stud 7 is engaged, in general, the following features are also preferred for the configuration or front cam extension 75:

1. End or tip 111 should be at a distance from sidewall 11 greater than a height of ridge 41 on a stud 7 to be engaged.
2. Angle A1, FIG. 2 of extension of surface 84 will typically be at least 15°, and not greater than 30°, most preferably within the range of 18° to 25°, inclusive.

In the event that surface 84 is not planer, in general the angle corresponding angle A1 will be an angle of a plane defined by the portion or portions of the surface 84 which will in fact engage or contact ridge 41, relative to the sidewall 11. Preferably surface 84 extends a length, between end 111 and bend 114 at least 0.25 inch; typically a distance of 0.25 inch to 1 inch, inclusive.

For typical arrangements angle A2, FIG. 4, will be on the order of 170°–178°, inclusive, typically 171°–175°, inclusive.

Still referring to FIG. 4, in general to operate effectively as a central receiver trough 76, the configuration of the central receiver trough 76 should be such that the sidewalls 130, 131 are spaced adequately apart, at least along a portion of their extension, to allow snug receipt of ridge 41 therein, during assembly, FIG. 2. In addition, sidewall 130 preferably extends at an angle, relative to sidewall 11, such that once the ridge 41 is received, it is difficult for the stud to be pulled back out of the receiver trough 76, at least without the use of a tool to bend clip 18. Also preferably, the distance of projection of ridge 41 into central receiver trough 76 should adequate to ensure a secure connection. Typically, the central receiver trough 76 would be formed to allow for a depth of this extension inwardly, of at least 0.1 inch, preferably at least 0.2 inch.

Turning attention now to rear spring extension 77, and referring to FIG. 4, preferably the length of extension between point 142 on central receiver trough 76, and the hinge line 144, for rear spring extension 77 is adequately long to allow a spring extension to accommodate enough movement of front cam extension 75 for a convenient snap fit without the use of tools or special equipment, but the distance is preferably not so long as to weaken significantly the structural integrity of the sidewall 11. It is foreseen that with typical materials from which tracks 5, 6 will be made in accord with the present invention, a distance of at least 0.75 inch, not more than 1.5 inches, and typically about 1 inch to 1.25 inches will be preferred.

In this context, reference to a hinge line 144 is meant to refer to the point or line along which the clip 18 is bent inwardly from wall 11.

It is noted that the particular preferred engagement between the clip 18 depicted in FIGS. 1 and 2, and the stud 7, is laterally fixed, i.e., fixed to inhibit unintended movement in the direction of the double-headed arrow 89, FIG. 2, but it is also vertically slidable, i.e., there is no interference at the clip 18 inhibiting sliding movement in the direction of arrow 130, FIG. 1, other than simply the extent to which the frictional engagement is snug. As a result, the stud clip arrangement described is easy to assemble and can even be utilized in association with a slip track wall, described in detail below.

Figure 5:
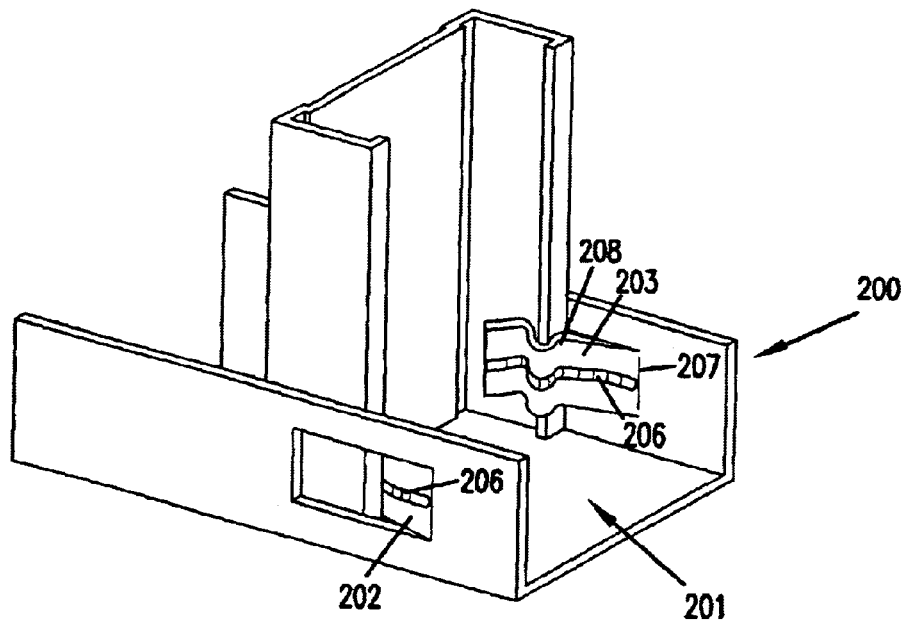
FIG. 5 is a fragmentary, perspective view of a portion of the assembly of FIG. 1, but depicting a first alternate clip member, to a clip member depicted in FIG. 1.

Referring to FIG. 5, a first alternate embodiment is depicted. In particular, track 200 includes a clip arrangement 201 comprising clips 202, 203, similar to clips 18, 19, except for the presence in clips 202, 203 of ridges 206. The ridges 206 can extend from at or near end 207 to region 208 or further, and provide added strength in the region of the bends. The ridges 206 can be easily formed during an operation to bend the clips 202, 203.

Figure 6:
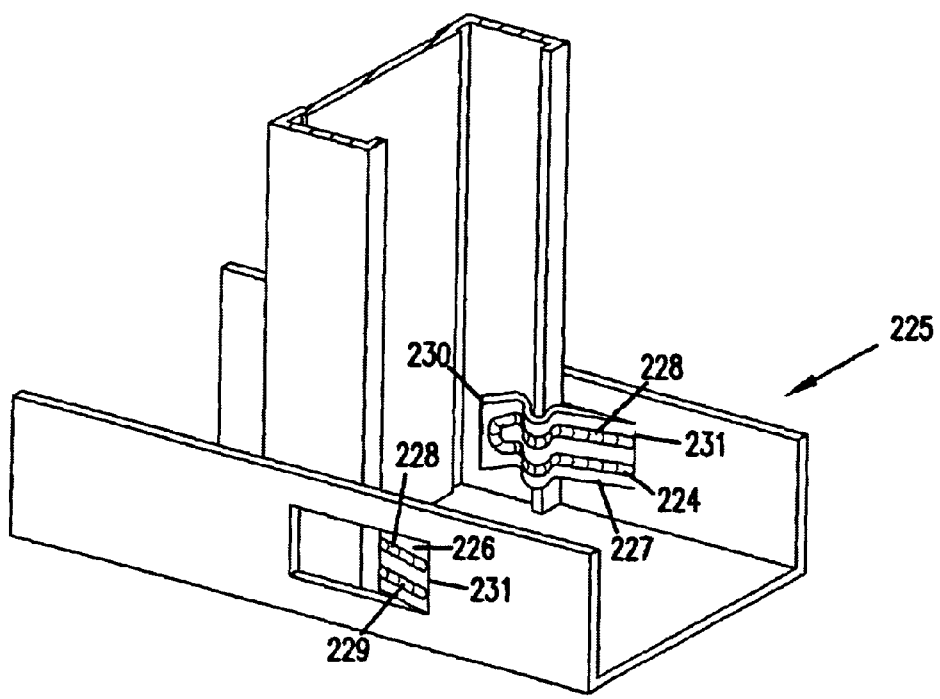
FIG. 6 is a fragmentary, perspective view analogous to FIG. 5, but depicting a second alternate clip member to that of FIG. 1.

Referring to FIG. 6, track 225 includes clips 226, 227, each of which includes parallel ribs 228, 229. The particular arrangement shown, the ribs 228, 229 extend into a portion of the clips adjacent to the front or free ends 230. In general, ribs 228, 229 can extend from ends 231 as far into the bends as appropriate and desired to provide a modification to the strength or spring nature of the various bends.

The intent by provision of FIGS. 5 and 6 is to show that a variety of clip configurations alternative to the ones depicted in FIGS. 1–4, can be used.

Generation of a Framework for Non-Slip Wall, For Example a Load Bearing Wall

For a load-bearing wall, it is necessary for the stud 7 to be bottomed out in each of the ceiling track 5 and the floor track 6. As a result, the stud 7 bears load without vertical ceiling movement. When the wall is a framework 1 is of this type, the ceiling track 5 and floor track 6 may, conveniently, be of identical size and dimension. A load-bearing wall is depicted in FIG. 1, with bottoming out of the stud 7 in the tracks 5 and 6 as indicated.

It is noted that for a load-bearing wall, a convenient depth for the troughs 13a, 26a, (i.e., dimensions L1, L2) is at least 1.5 inches to provide for good, strong, structural support, and typically not more than 3 inches, to avoid use of excess material, when the tracks 5, 6 are constructed from appropriate structural steel.

Even when the wall framework 1 is not load bearing, a construction analogous to that described for a load bearing wall is convenient. That is, typically and preferably, except as described below for slip walls, the stud 7 will be bottomed out in the ceiling track 5 and the floor track 6, with the tracks 5, 6 being identical and as characterized.

Slip Track Walls

It is an advantage that the principles described herein can be applied for the formation of slip track walls. In such walls, the ceiling track is attached to the roof or ceiling framework of the building, but the stud is not bottomed out in the ceiling track. As a result, as the ceiling height shifts in time, the ceiling track 5 can slide vertically along the stud. Various prior art slip tracks or slip walls are described for example in U.S. Pat. Nos. 5, 471,805 and 5,755,066, incorporated herein by reference.

A significant reason why the principles described herein are applicable to slip walls, concerns the nature of the engagement between the clip arrangement and the stud. Specifically, the clip arrangement is configured so that while the stud is held securely with respect to horizontal movement, slide connection is provided between the stud and the clip arrangement.

The slip track wall framework is depicted in FIG. 7 at 300. In general, wall framework 300 comprises floor track 301, ceiling track 302 and stud 307. Floor track 301 includes clip arrangement 314 constructed and arranged analogously to clip arrangement 14, FIG. 1; and ceiling track 302 includes clip arrangement 327 constructed and arranged analogously to clip arrangement 27, FIG. 1. The stud 307 generally has a configuration analogous to stud 7, FIG. 1.

Principal differences between the assembly 300 FIG. 7, and the assembly 1, FIG. 1, result from dimension L2 in FIG. 7 being greater than dimension L1 in FIG. 7, as opposed to equal as indicated with respect to FIG. 1. Otherwise, the system is generally as described for FIG. 1.

In general, in order to utilize the principles of the present disclosure in a preferred slip track wall, it is generally preferred that:

1. The stud 307 be bottomed out on the floor track 301 and;
2. The ceiling track 302 is spaced from the floor track 301 such that when the stud 307 is engaged with the stud clip arrangement 327 in the ceiling track 302, a space or gap 320 exists between end 321 of the stud 307, and the center extension 323 of the ceiling track 302.

In general, for a desirable slip track, preferably when the wall frame 300 is assembled, the gap 320 should be at least about 0.25 inch, typically within the range of 0.25 inch to 8 inches, inclusive.

Again, when preferred arrangements of slip track walls are made by using the principles described herein, the ceiling track 302 will typically be configured such that it is deeper, in dimension L2, than is the floor track, in dimension L1. The extra distance allows, in a convenient manner, for the gap 320 between the end 321 of the stud 307 and center extension 323, without reducing a dimension of extension 340 between edge 341 and frame 342, relative to extension 100 (FIG. 1) of ceiling track 5. Thus, the strength provided by extension 340 is retained. It is not necessary to increase the depth of the floor track 301, relative to the floor track 6, FIG. 1, since slip at this location is not required, and added extra depth would merely increase weight and expense.

Covered Frameworks

Figure 8:
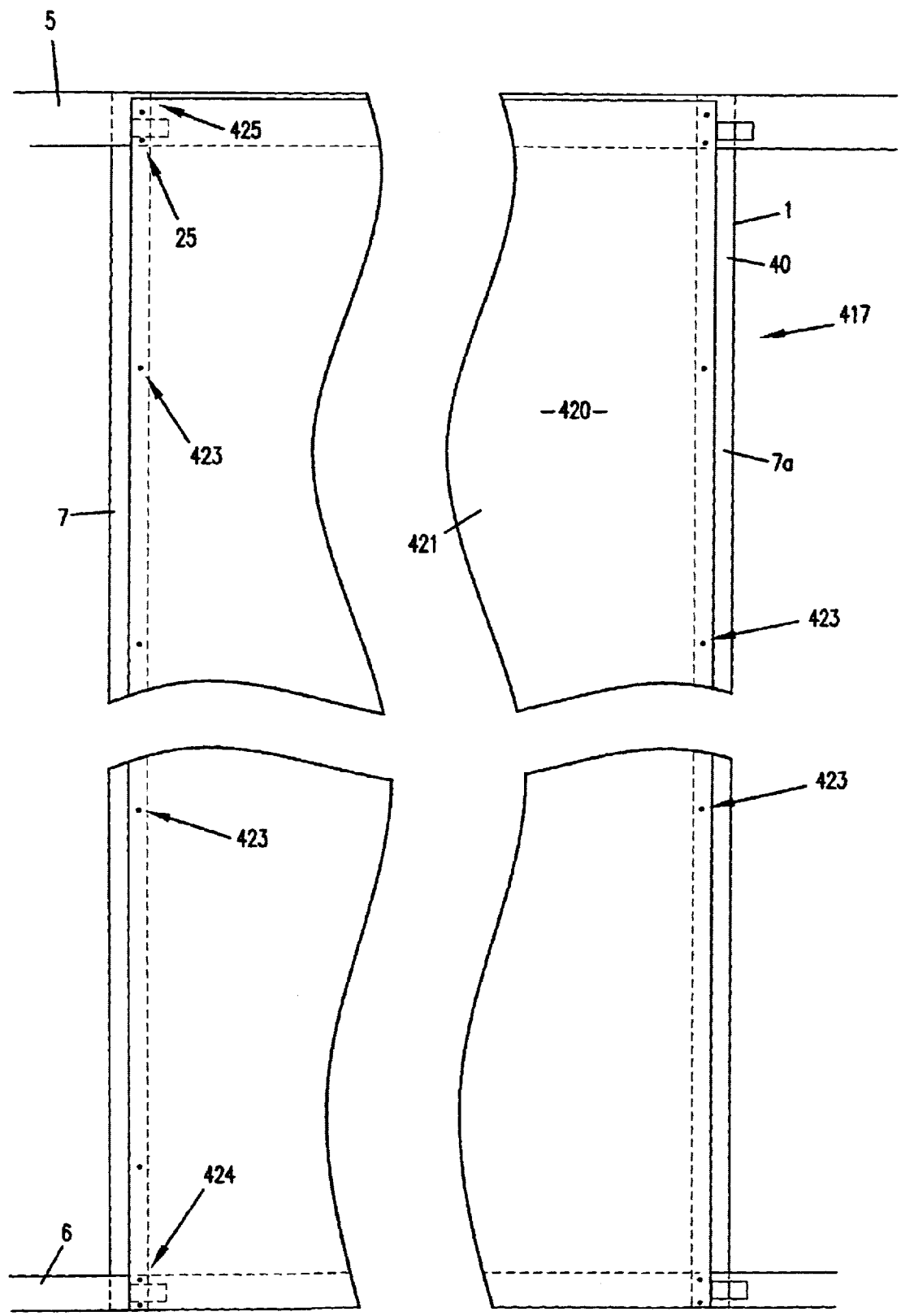
FIG. 8 is a fragmentary, schematic, side elevational view of the assembly of FIG. 1, depicted with a wall covering mounted thereon, to form a standard wall.

Attention is now directed to FIG. 8. In FIG. 8, a wall 417 is depicted in schematic, utilizing a wall framework 1 having a wall covering 420 mounted thereon. The wall covering 420 may comprise a variety of constructions, the particular one depicted comprising sheets of wall board 421, for example drywall, secured to hanger walls 40 of the studs 7, 7a by screws 423. The covering, 420 is also shown secured to floor track 6, by screws 424. It is noted that the particular wall 417 depicted is not a slip wall, and thus wallboard 421 is also shown secured by screws 425 to ceiling track 5.

Figure 9:
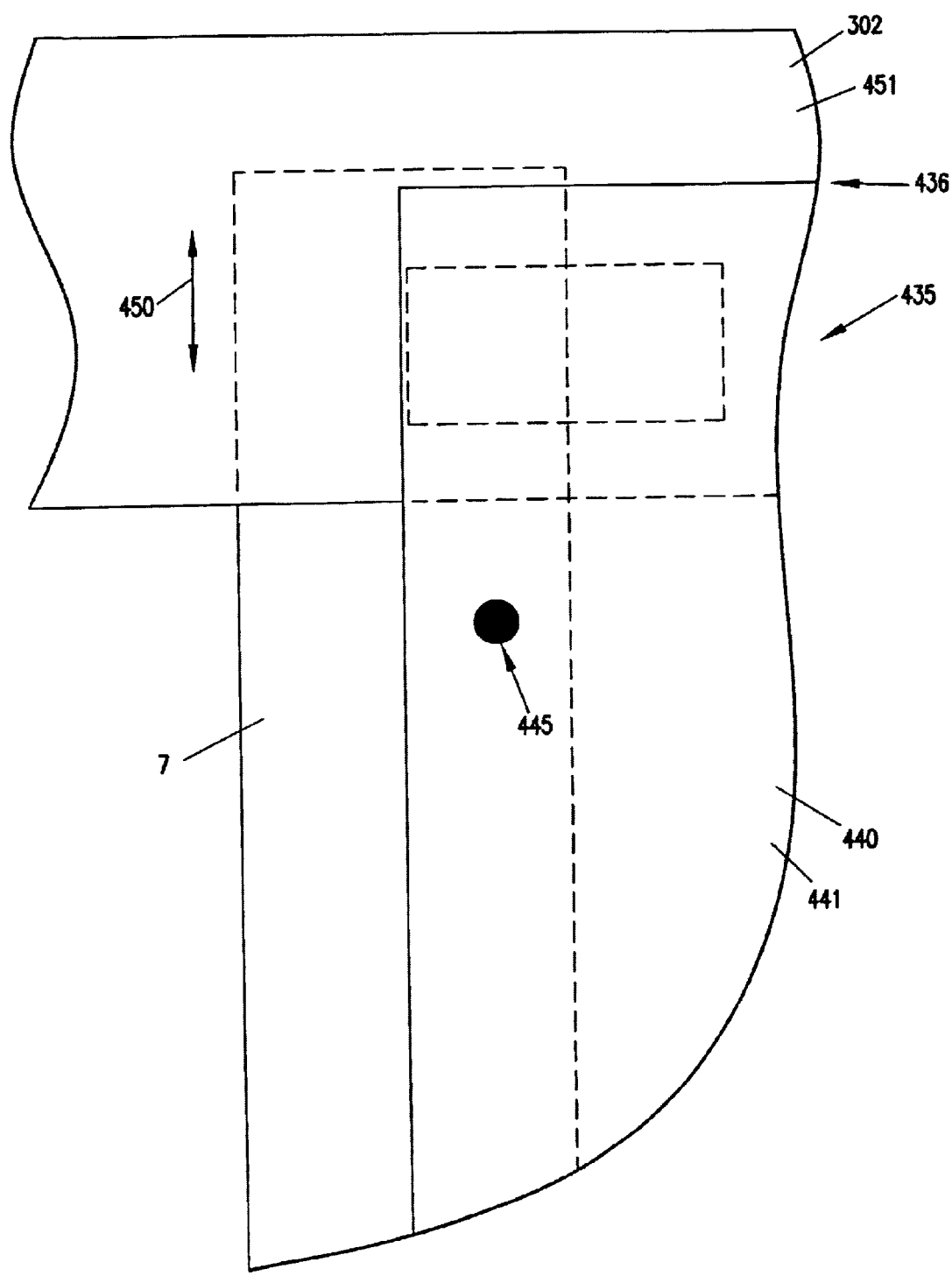
FIG. 9 is an enlarged, fragmentary schematic side elevational view of a portion of the wall assembly of FIG. 7, depicted with a wall covering thereon.

Attention is now directed to FIG. 9, which depicts, in a fragmentary schematic view, a portion of a slip track sidewall, specifically a portion adjacent a building ceiling. In FIG. 9, a wall 435 having a slip track wall framework 436 is depicted. In this instance, wall covering 440, again comprising sheets of wall board 441 are secured to stud 7 by screws 445 (only one depicted). The wall board 441 would also be secured over a floor track, not shown, similarly to the wall of FIG. 8. However, in contrast to wall 417, FIG. 8, the wall covering 440 for wall 435, although positioned to extend in covering relationship to a portion of side 451 of ceiling track 302, is not secured to either the stud 7 or the ceiling track 302, in regions that would interfere with sliding movement between the ceiling track and the stud 7 indicated at arrow 450. Thus, movement between the stud 7 and the ceiling track 302 is possible.

Some Selected Alternate Embodiments

Alternate applications of principles according to the present invention will be apparent from the descriptions below in the context of FIGS. 10, 11 and 12.

First, it is noted that the track need not comprise a single integral piece. That is, the sidewalls may be formed of separate pieces, separately anchored. An example of this is depicted in connection with the embodiment shown in FIG. 10.

Figure 10:
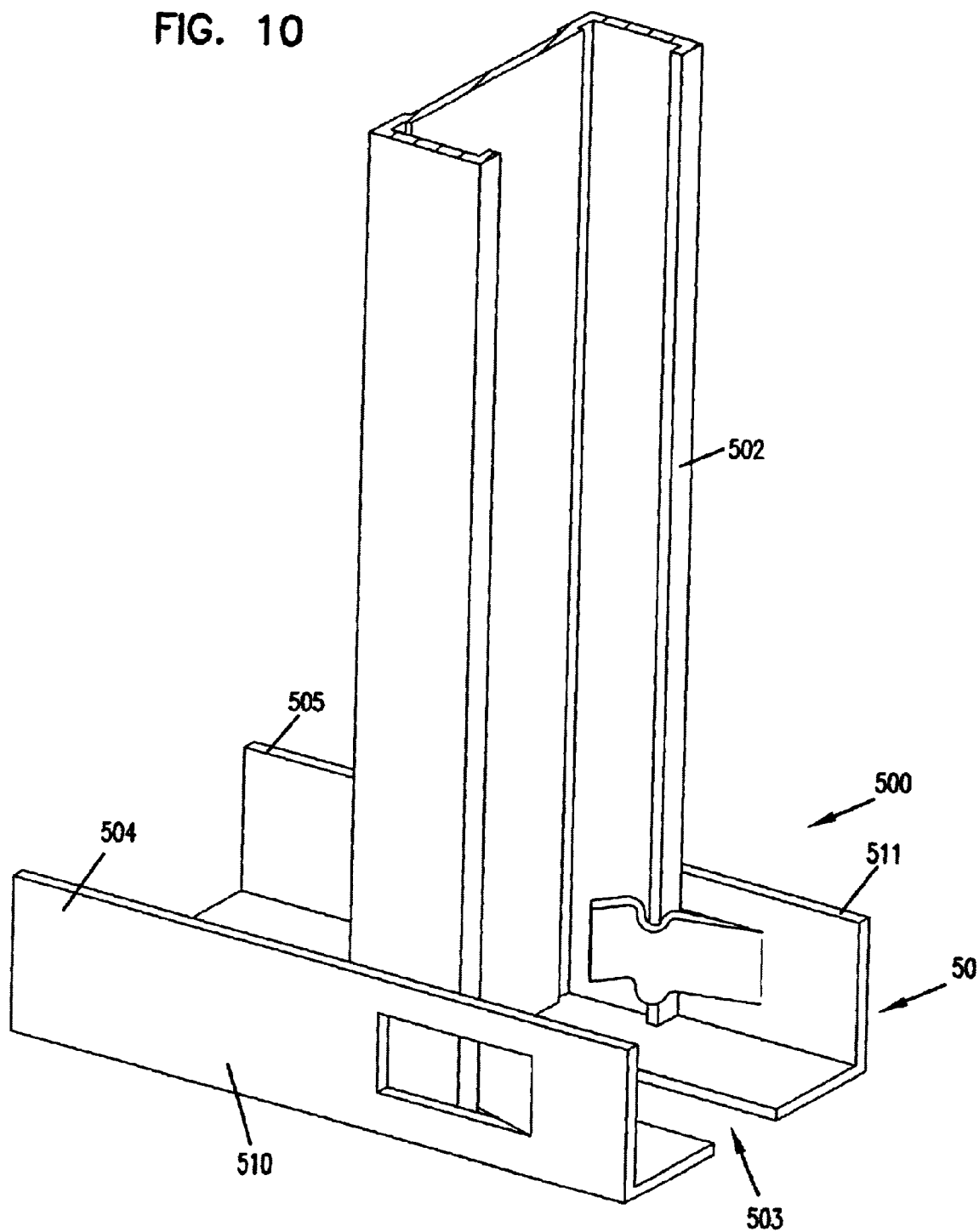
FIG. 10 is an enlarged, fragmentary schematic perspective view analogous to FIGS. 1 and 7, depicting a second alternate embodiment to the arrangements of FIGS. 1 and 7.

Referring to FIG. 10, a wall framework assembly 500 is depicted. The assembly comprises a track arrangement 501 and stud 502. The track arrangement 501 comprises a central extension 503 and first and second sidewalls 504 and 505. The central extension 503 is formed from two separate pieces 510, 511. Other than this modification, the assembly 500 of FIG. 10, is analogous to the arrangement shown in FIGS. 1 and 7. Thus, this modification could be applied in connection with any of the arrangements previously described. The modification of FIG. 10 merely indicates that the track can be split, for example along the central extension, and mounted as two pieces instead of one.

Yet another alternate application of the principles described herein would involve utilizing only a single clip at each end, to secure each stud in place, as opposed to a pair of clips. Such a modification is depicted in the arrangement 550 of FIG. 11. The wall framework arrangement 550 in FIG. 11 includes a track arrangement 551 and a stud 552. The track arrangement 551 comprises a central extension 553, and first and second sidewalls 554 and 555. However, it is noted that there is only a single clip arrangement associated with stud 552; that clip arrangement being depicted at 556 in wall 555. Thus, stud 552 is secured in place in track 551 by a single clip 556, as opposed to a pair of clips. Except for this modification, the arrangement of FIG. 11 is analogous to the embodiments of FIGS. 1 and 7. Of course, the modification of FIG. 10 could be used in association with the arrangement of FIG. 11.

Figure 11:
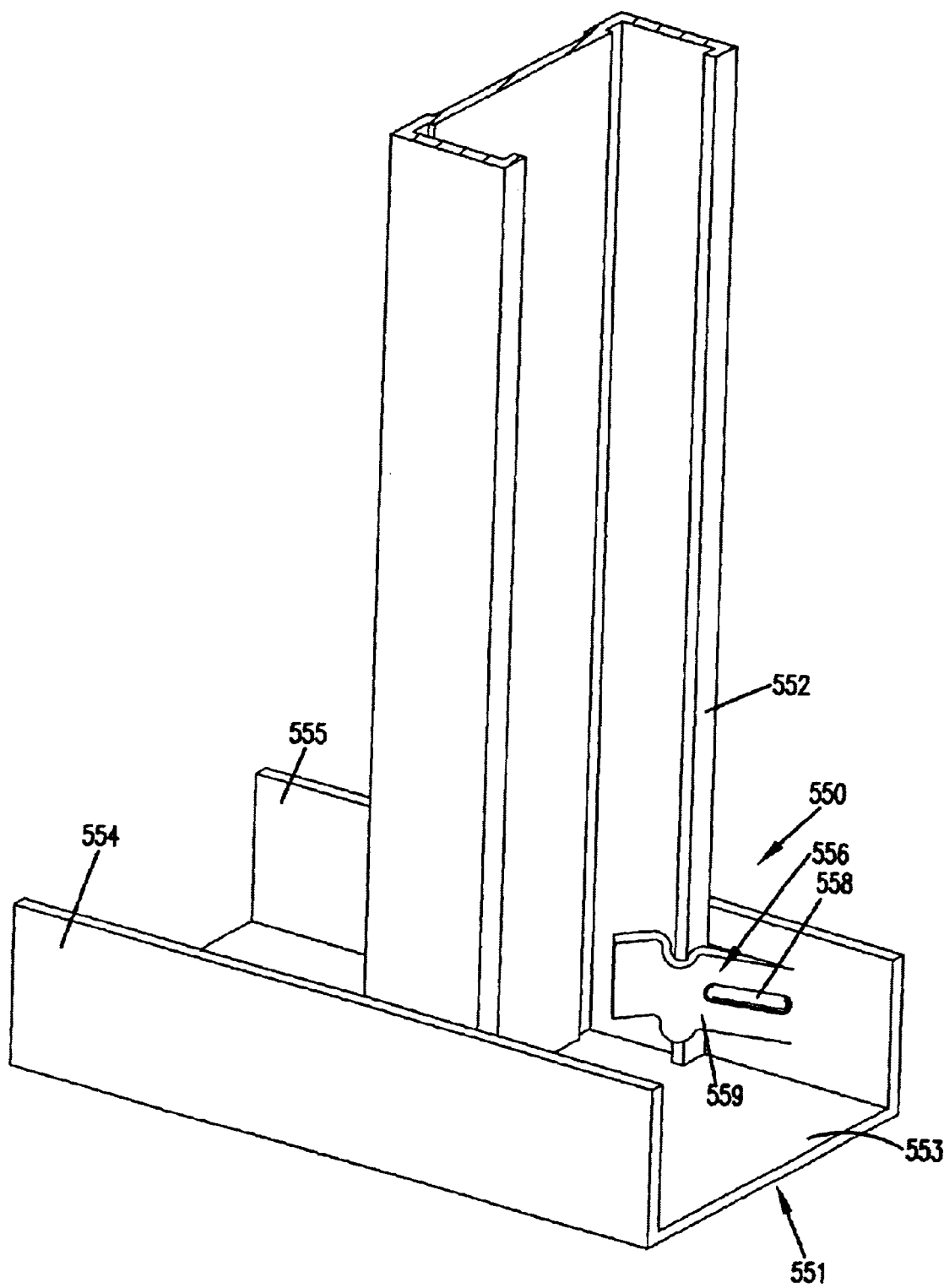
FIG. 11 is an enlarged, fragmentary schematic perspective view of a third alternate embodiment to the arrangements depicted in FIGS. 1, 7 and 11.
Figure 12:
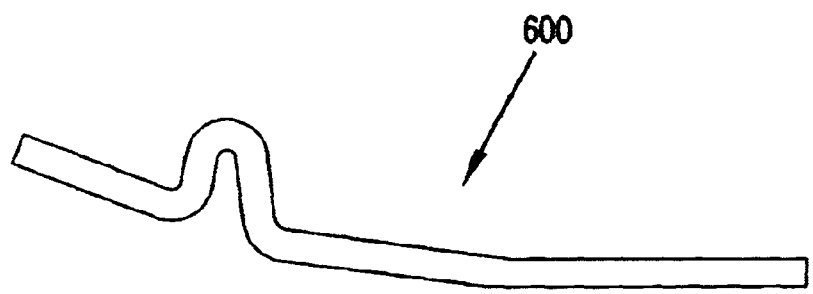
FIG. 12 is a top edge view of a clip arrangement useable in selected alternate embodiments of the present invention.

In FIG. 11 an alternate ridge 558 in clip 556, versus ridges 206 in clips 202, 203, FIG. 5, respectively, is shown. In the embodiment of FIG. 11, the reinforcing ridge 558 in clip 556 extends only to bend 559. This ridge construction could be used in any of the embodiments described.

In all embodiments depicted in FIGS. 1–11, the bent extension is depicted as integral with a portion of the sidewall. Alternatively, the bent extension could be premade, and then be secured to the wall, for example, by welding. Such a non-integral (with the sidewall) bent extension could be secured to an inside of an associated sidewall, or it could be secured to an outside of an associated sidewall, with a portion projecting through an aperture of the sidewall. In FIG. 12, a non-integral bent extension 600 is depicted. It has a configuration similar to the bent extension 18a of FIG. 4, except it is a single separate piece that would be attached to a sidewall in use. The arrangement of FIG. 12, could be utilized in association with any of the various arrangements described above, for effective wall framework assembly. The variation of FIG. 12 is to merely indicate that unless otherwise stated, there is no specific requirement that the clip be formed as an integral component with the sidewall, although, as indicated above, such is generally convenient and preferred.

Examples of Usable Materials and Dimensions; Examples of Component Manufacture;

A typical, usable stud type, is the type sold by Members of the Steel Stud Manufacturer's Association, as cold-formed steel framing members. Usable studs are typically 8 feet to 40 feet long, inclusive.

Preferred studs will have a width of the hanger walls, i.e., horizontal dimension, when stud is stood vertically, of at least 1.25 inches, typically 1.25 to 3 inches, inclusive; and, an exterior height of ridge 41, FIG. 2, of 0.625 inch, with the interior height of ridge 41, FIG. 2 resulting from the stud thickness.

For such typical standard studs, the width between opposite hanger walls will typically be a standard dimension within the range of 1.625 inches to 12 inches, inclusive, typically about 2.5–6 inches, inclusive. This dimension will serve to set or establish internal width of the preferred tracks.

Preferred tracks, whether floor or ceiling, will typically comprise galvanized steel, for example 12 gauge to 25 gauge steel, inclusive. The inside width, will be chosen to match the width of the corresponding stud, typically within the range of 1.625 to 12 inches, inclusive, generally about 2.5 to 6 inches, inclusive. Preferred tracks will generally comprise three flat surfaces.

For typical systems, the distance between an outer edge, (for example, edge 11a) and an associated frame (for example, frame 97) is at least 0.25 inch, typically 0.25–0.75 inch, inclusive.

Typically, the size of frame 97 will be about 2.5 inches long by 1.125 inches high.

A typical preferred clip would have dimensions as described previously.

In general, the depth of a floor track, or ceiling track for a non-slip wall, would be no more than about 2.5 inch, typically not less than about 1.25 inches. The depth of a ceiling track for a slip wall, would typically have an added depth of at least 0.5 inch, and generally not more than 8 inches, most typically about 1 inch, relative to the depth of the floor track.

A variety of spacings for clips, longitudinally, along the ceiling track and floor track can be used. An example would be to position a clip pair, on center, longitudinally spaced every 8 inches, along the length of the tracks.

The walls can be easily assembled by positioning a stud in the tracks, and pushing it against the clips until the snap lock is obtained.

A variety of methods can be utilized to manufacture tracks in accord with the present invention. The specific configuration is depicted in the drawings, can be readily made by bending elongate strips of metal, to form the three-sided track, and by using a punch and die arrangement, to form the individual clips.

Wallboard can be secured to the tracks and studs, in a variety of conventional manners, for example, with screws. Any of a wide variety of types of wallboard can be used. Wall board can be selected for fire resistance, if desired. That is, wall frameworks assembled in accord with the principles described herein, can be used as firewalls.

It is noted that the principles described herein could be used in structures other than walls. In such instances, the studs could be frame members extending between tracks, vertical and non-vertical orientations are, of course, possible.

What is claimed is:

1. A track arrangement for supporting a wall stud; said track arrangement comprising:
   (a) a first sidewall; and,
   (b) a first stud clip arrangement comprising at least a first clip;
      (i) said first clip having a point of attachment and a free end, said first clip comprising:
         (A) a front cam surface facing said first sidewall and extending at an acute angle thereto; and, (B) three bends spaced apart from said point of attachment of said first clip, said three bends defining a stud ridge receiver trough having opposing sidewalls that converge at an apex, said stud ridge receiver trough oriented: with a stud ridge receiver trough opening thereof directed toward said first sidewall; and, with the front cam surface of the first clip extending between the stud ridge receiver trough and the free end of the first clip.

2. A track arrangement according to claim 1 wherein:
(a) said front cam surface of said first clip extends at an angle of at least 15° relative to the first sidewall.

3. A track arrangement according to claim 2 wherein:
(a) said stud ridge receiver trough of said first clip has a center bend having an inside angle within the range of 15° to 25°, inclusive.

4. A track arrangement according to claim 3 wherein:
(a) said first clip comprises a first bent extension non-integral with, and secured to, said first sidewall.

5. A track arrangement according to claim 3 wherein:
(a) said first clip comprises a first bent extension integral with said first sidewall.

6. A track arrangement according to claim 3 wherein:
(a) said first sidewall has an outer edge; and
(b) said first clip is spaced from said outer edge of said first sidewall by a distance of at least 0.25 inch.

7. A track arrangement according to claim 1 further comprising:
(a) a second sidewall oriented in extension opposed to said first sidewall;
  (i) said first stud clip arrangement comprising a pair of stud clips including said first clip and a second clip;
    (A) said three bends defining said stud ridge receiver trough in said first clip defining the associated stud ridge receiver opening oriented away from the second sidewall;
    (B) said second clip of said pair of stud clips having a point of attachment and a free end, said second clip comprising:
      (1) a front cam surface facing said second sidewall and extending at an acute angle thereto; and,
      (2) three bends spaced apart from said point of attachment of the second clip, said three bends defining a stud ridge receiver trough having opposing sidewalls that converge at an apex, said stud ridge receiver trough oriented: with a stud ridge receiver trough opening directed toward said second sidewall and away from said first sidewall; and, with the front cam surface of the second clip extending between the stud ridge receiver trough and the free end of the second clip.

8. A track arrangement according to claim 7 wherein:
(a) said first clip comprises a first bent extension integral with said first sidewall; and,
(b) said second clip comprises a second bent extension integral with said second sidewall.

9. A track arrangement according to claim 8 wherein:
(a) said front cam surface of said first bent extension extends at an angle of at least 15° and not more than 30° relative to the first sidewall; and,
(b) said front cam surface of said second bent extension extends at an angle of at least 15° and not more than 30° relative to the second sidewall.

10. A track arrangement according to claim 9 wherein:
(a) said front cam surface of said first bent extension has a length of extension of at least 0.25 inch; and,
(b) said front cam surface of said second bent extension has a length of extension of at least 0.25 inch.

11. A track arrangement according to claim 10 wherein:
(a) said stud ridge receiver trough of said first bent extension has:
  (i) a front bend having an inside angle within the range of 75° to 85°, inclusive;
  (ii) a center bend having an inside angle within the range of 15° to 25°, inclusive; and,
  (iii) a rear bend having an inside angle within the range of 95° to 105°, inclusive; and,
(b) said stud ridge receiver trough of said second bent extension has:
  (i) a front bend having an inside angle within the range of 75° to 85°, inclusive;
  (ii) a center bend having an inside angle within the range of 15° to 25°, inclusive; and,
  (iii) a rear bend having an inside angle within the range of 95° to 105°, inclusive.

12. A track arrangement according to claim 11 wherein:
(a) said first bent extension of said first clip includes a spring extension having a length of at least 0.75 inch and projecting from said first sidewall to said stud ridge receiver trough of said first bent extension;
(b) said second bent extension of said second clip includes a spring extension having a length of at least 0.75 inch and projecting from said second sidewall to said stud ridge receiver trough of said second bent extension.

13. A track arrangement according to claim 12 wherein:
(a) said spring extension of said first bent extension bends inwardly, from said first sidewall, at an inside angle within the range of 170° to 178°, inclusive; and
(b) said spring extension of said second bent extension bends inwardly, from said second sidewall, at an inside angle within the range of 170° to 178°, inclusive.

14. A track arrangement according to claim 13 wherein:
(a) said first bent extension is centrally disposed relative to an outer edge of said first sidewall; and,
(b) said second bent extension is centrally disposed relative to an outer edge of said second sidewall.

15. A track arrangement according to claim 14 wherein:
(a) said first bent extension is spaced from the outer edge of said first sidewall by a distance of at least 0.25 inch; and,
(b) said second bent extensions is spaced from the outer edge of said second sidewall by a distance of at least 0.25 inch.

16. A wall framework assembly comprising:
(a) a first track; said first track including:
  (i) a first sidewall having an outer edge, said first sidewall having a first frame defined by a first open cut; and,
  (ii) a first stud clip arrangement comprising at least a first stud clip located within said first frame;
    (A) said first stud clip having a point of attachment and a free end, said first stud clip comprising:
      (1) a front cam surface facing said first sidewall and extending at an acute angle thereto; and,
      (2) three bends spaced apart from said point of attachment of said first stud clip, said three bends defining a stud ridge receiver trough having opposing sidewalls that converge at an apex, said stud ridge receiver trough oriented:
with a stud ridge receiver opening directed
toward said first sidewall; and, with the front
cam surface of the first stud clip extending
between the stud receiver trough and the free
end of the first stud clip; and
(b) a vertical wall stud; said vertical wall stud including:
(i) a back extension;
(ii) a first hanger wall;
(iii) a first stud ridge positioned on said first hanger wall and extending away from said hanger wall;
(c) said vertical wall stud being positioned:
(i) with a portion of the vertical wall stud located between the first clip and the first open cut, and a portion of the first stud ridge received within the stud ridge receiver trough of the first clip.

17. A wall framework assembly according to claim 16 wherein:
(a) said track includes a second sidewall oriented opposed to said first sidewall, said second sidewall having a second frame defined by a second open cut; and
(b) said first stud clip arrangement comprises a pair of stud clips including the first stud clip located within said first frame and a second stud clip located within said second frame;
(A) the second stud clip of said pair of stud clips having a point of attachment and a free end, said second stud clip comprising:
(1) a front cam surface facing said second sidewall and extending at an acute angle thereto; and,
(2) three bends spaced apart from said point of attachment of said second stud clip, said three bends defining a stud ridge receiver trough having opposing sidewalls that converge at an apex, said stud ridge receiver trough oriented: with a stud receiver opening directed away from said first sidewall; and, with the front cam surface of the second stud clip extending between the stud ridge receiver trough and the free end of the second stud clip.

18. A wall framework assembly according to claim 17 including:
(a) a second track; said first track comprising a floor track; and, said second track comprising a ceiling track including:
(i) first and second ceiling track sidewalls oriented in extension opposed to one another with a ceiling track central extension positioned therebetween, said first and second ceiling track sidewalls having first and second ceiling frames defined by first and second ceiling open cuts; and
(ii) a first ceiling track stud clip arrangement comprising a ceiling track pair of stud clips;
(A) a first ceiling track stud clip of said ceiling track pair of stud clips, positioned within said first ceiling frame, and having a point of attachment and a free end, said first ceiling track stud clip comprising:
(1) a front cam surface facing said first sidewall of said ceiling track and extending at an acute angle thereto; and
(2) three bends spaced apart from said point of attachment of said first ceiling track stud clip, said three bends defining a first ceiling track stud ridge receiver trough having opposing sidewalls that converge at an apex, said first ceiling track stud ridge receiver trough oriented: with a stud ridge receiver opening directed away from said second ceiling track sidewall; and, with the front cam surface of the first ceiling track stud clip extending between the first ceiling track stud ridge receiver trough and the free end of the first ceiling track stud clip; and
(B) a second ceiling track stud clip of said ceiling track pair of stud clips, positioned within said second ceiling frame, and having a point of attachment and a free end, said second ceiling track stud clip comprising:
(1) a front cam surface facing said second sidewall of said ceiling track and extending at an acute angle thereto; and,
(2) three bends spaced apart from said point of attachment of said second ceiling track stud clip, said three bends defining a second ceiling track stud ridge receiver trough having opposing sidewalls that converge at an apex, said second ceiling track stud ridge receiver trough oriented: with a second ceiling track stud ridge receiver trough opening directed away from said first ceiling track sidewall; and, with the front cam surface of the second ceiling track stud clip extending between the stud ridge receiver trough and the free end of the second ceiling track stud clip;
(b) said vertical wall stud being positioned:
(i) with portions thereof positioned between the first and second ceiling track stud clips and the respective first and second ceiling open cuts; and,
(ii) with a portion of the first stud ridge received within the stud ridge receiver trough of the first ceiling track clip; and, with a portion of the second stud ridge received within the stud ridge receiver trough of the second ceiling track clip.

19. A wall framework assembly according to claim 18 wherein:
(a) the ceiling track is at least 0.5 inch deeper than the floor track.

20. A method of assembling a wall framework assembly; said method including steps of:
(a) providing a track arrangement comprising: first and second sidewalls oriented in extension opposed to one another, each of the first and second sidewalls having an outer edge; and, a first stud clip arrangement comprising a pair of stud clips;
(i) a first stud clip of said pair of stud clips having a point of attachment and a free end, said first stud clip comprising:
(A) a front cam surface facing said first sidewall and extending at an acute angle thereto; and
(B) a stud ridge receiver trough spaced apart from said point of attachment of said first stud clip and oriented: with a stud ridge receiver opening thereof directed away from said second sidewall; and, with the front cam surface of the first stud clip extending between the stud ridge receiver trough and the free end of the first stud clip; and,
(ii) a second stud clip of said pair of stud clips having a point of attachment and a free end, said second stud clip comprising:
(A) a front cam surface facing said second sidewall and extending at an acute angle thereto; and,
(B) a stud ridge receiver trough spaced apart from said point of attachment of said first stud clip and oriented: with a stud ridge receiver opening directed away from said first sidewall; and, with the front cam surface of the second stud clip extending between the stud ridge receiver trough and the free end of the second stud clip;

(b) providing a vertical wall stud including:
   (i) a back extension;
   (ii) first and second opposed hanger walls positioned with said back extension therebetween;
   (iii) a first stud ridge positioned on said first hanger wall and extending toward said second hanger wall; and
   (iv) a second stud ridge positioned on said second hanger wall and extending toward said first hanger wall;

(c) positioning the vertical wall stud with an end thereof between the first and second sidewalls of the track arrangement;

(d) moving the vertical wall stud toward the first pair of stud clips such that:
   (i) said first stud ridge of said vertical wall stud engages said front cam surface of said first stud clip; and
   (ii) said second stud ridge of said vertical wall stud engages said front cam surface of said second stud clip;

(e) said step of moving including continuing to move the vertical wall stud toward the first pair of stud clips to:
   (i) bend the first stud clip toward the second sidewall; and
   (ii) bend the second stud clip toward the first sidewall; and (f) said step of moving including continuing to move the vertical wall stud until:
   (i) the first stud ridge engages the stud ridge receiver trough of the first stud clip, allowing the first stud clip to bend back toward the first sidewall; and,
   (ii) the second stud ridge engages the stud ridge receiver trough of the second stud clip, allowing the second stud clip to bend back toward the second sidewall.

21. A track arrangement for supporting a wall stud; said track arrangement comprising:
   (a) a first sidewall; and,
   (b) a first stud clip arrangement comprising at least a first clip;
      (i) said first clip comprising a first bent extension having a free end, said first bent extension comprising:
         (A) a spring extension projecting from a bend line on said first sidewall to said stud ridge receiver trough, the spring extension bending inwardly, from said first sidewall, at an inside angle within the range of 170° to 178°, inclusive;
         (B) a front cam surface facing said first sidewall and extending at an acute angle thereto; and
         (C) three bends defining a stud ridge receiver trough oriented: with a stud ridge receiver trough opening thereof directed toward said first sidewall; and, with the front cam surface of the first bent extension extending between the stud ridge receiver trough of the first bent extension and the free end of the first bent extension.

22. A track arrangement according to claim 21 wherein:
   (a) said first bent extension is centrally disposed relative to an outer edge of said first sidewall; and,
   (b) said second bent extension is centrally disposed relative to an outer edge of said second sidewall.

23. A track arrangement according to claim 1 wherein:
   (a) said three bends spaced apart from said point of attachment are located at least 0.75 inches from said point of attachment of the first clip.

24. A track arrangement according to claim 23 wherein:
   (a) said first clip includes ribs formed in at least a portion of the first clip between said point of attachment and said stud ridge receiver trough.

* * * * *